United States Patent [19]
Lee

[11] Patent Number: 5,597,171
[45] Date of Patent: Jan. 28, 1997

[54] VEHICLE SUSPENSION SYSTEM FOR A STEERABLE DRIVE WHEEL

[75] Inventor: Unkoo Lee, Kyungki-do, Rep. of Korea

[73] Assignee: Hyundai Motor Company, Seoul, Rep. of Korea

[21] Appl. No.: 442,974

[22] Filed: May 17, 1995

[51] Int. Cl.⁶ ............................................. B60G 5/00
[52] U.S. Cl. ........................... 280/667; 280/675; 280/691
[58] Field of Search .................................. 280/660, 667, 280/675, 691, 693, 696, 701

[56] References Cited

U.S. PATENT DOCUMENTS

| | | | |
|---|---|---|---|
| 4,842,297 | 6/1989 | Takahashi | 280/675 |
| 4,878,688 | 11/1989 | Kubo | 280/693 |
| 5,284,353 | 2/1994 | Shinji et al. | 280/660 |
| 5,286,052 | 2/1994 | Lukianov | 280/675 |
| 5,372,377 | 12/1994 | Lee | 280/691 |
| 5,380,035 | 1/1995 | Lee | 280/691 |

Primary Examiner—Kenneth R. Rice
Attorney, Agent, or Firm—Birch, Stewart, Kolasch & Birch, LLP

[57] ABSTRACT

A vehicle suspension system for a steerable drive wheel includes a wheel carrier for rotatably supporting a wheel; an outer upper control arm having a first end pivotally coupled to the wheel carrier and a second end. There is an inner upper control arm having a first end pivotally coupled to the second end of the outer upper control arm and a second end coupled to a subframe, and a lower control arm having front and rear control arms to connect a lower end of the wheel carrier to the subframe and a vehicle body, respectively. A connecting link having an upper end coupled to a middle portion of the outer upper control arm and a lower end coupled to the lower control arm, and a strut assembly for absorbing vibration and impact transmitted in an up and down direction, which is formed with a shock absorber and a spring. A lower end of the strut assembly is positioned on an upper surface of the outer upper control arm and an upper end of the strut assembly being supported on a supporting portion of the subframe.

7 Claims, 6 Drawing Sheets

VEHICLE SUSPENSION SYSTEM FOR A STEERABLE DRIVE WHEEL

BACKGROUND OF THE INVENTION

1. Field of the Invention

The present invention relates to a vehicle suspension system for a steerable drive wheel and, more particularly to a vehicle suspension system which makes it possible to set up an imaginary kingpin axis to optimize the characteristics of the geometry with respect to the vehicle steering, improves handling safety by setting up an imaginary link and minimizing the variation ratio of the height of a roll center, enhances free layout degree with respect to a change in the angle of camber and tread, and improves driving safety by lowering a mounting point of the shock absorber and a hood line.

2. Description of Related Art

The primary functions of a suspension system are to (1) provide vertical compliance so wheels can follow an uneven road, thereby isolating a vehicle body from roughness in the road, (2) maintain the wheels in a proper steer and camber attitudes to the road surface, (3) react to a control force produced by tires-longitudinal acceleration and braking forces, lateral force, and braking and driving torques, (4) resist roll of the vehicle body, and (5) keep the tires in contact with the road with minimal load variations.

The common designs for the steerable wheel of the vehicle are of Wishbone and MacPherson types. FIGS. 5A and 5B illustrate a conventional MacPherson type suspension system which comprises a wheel carrier 100, a strut assembly 104 having a shock absorber 102 and 103, a lower arm 106, and a ball joint 108. The MacPherson strut provides major advantages in package space for a space for a transverse engine.

When the offset A becomes small, the knuckle loads and kingpin loads are reduced and the tendency of toe-out is reduced during driving. In order to make the offset A smaller or negative (−), a supporting point 110 of the strut assembly 104 should be moved to the engine room side or the ball joint 108 should be moved to the outside of the wheel. However, in case of the former, the effective volume of the engine room is reduced and the kingpin angle α becomes too large, which adversely affects cornering performance. In case of the latter, it is difficult to move the ball joint toward the wheel, because of the interference with the brake disc.

FIGS. 6A and 6B illustrate a conventional Wishbone type suspension system 128 which comprises upper and lower arms 120 and 122, a steering knuckle 124, a shock absorber 126, and ball joints 130 and 132 for connecting the upper and lower arms to the steering knuckle 124, respectively. In the Wishbone type suspension system, the problem of making the offset A smaller or negative (−) is similar to the MacPherson type suspension system.

As described above, in the conventional MacPherson and Wishbone type suspension systems, a free layout degree for establishing the kingpin angle α is limited within a small range and there is a limit to improve the functions of suspension systems. Also, since the bounce and rebound of the wheel is dependent on a short control link such that the variation rate of the height of the roll center becomes large, the driving stability is relatively lacking. Further, since the number of the links of the suspension systems are small, the impacts applied to the vehicle body cannot be spread over a wide area and the ability of the suspension system to absorb impacts is not good, which causes the ride comfort and impact safety to be poor.

SUMMARY OF THE INVENTION

Accordingly, the present invention has been made in an effort to solve the above-described problems.

It is an object of the present invention to provide a vehicle suspension system for a steerable drive wheel which can improve handling safety by making it easy to set up an imaginary kingpin axis and reducing a variation ratio of the height of the roll center.

It is another object of the present invention to provide a vehicle suspension system for a steerable drive wheel which can enhance free layout degree by establishing the kingpin axis and the change of camber and tread.

It is a further object of the present invention to provide a vehicle suspension system which can improve driving safety by lowering a mounting point of the shock absorber and a hood line.

Additional objects and advantages of the invention will be set forth in part in the description which follows, and in part will be inherent from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention provides a vehicle suspension system for a steerable drive wheel, comprising: a wheel carrier for rotatably supporting a wheel; an outer upper control arm having a first end pivotally coupled to the wheel carrier and a second end; inner upper control arm having a first end pivotally coupled to the second end of the outer upper control arm and a second end coupled to a subframe; a lower control arm having front and rear control arms to connect a lower end of the wheel carrier to the subframe and a vehicle body, respectively; a connecting link having an upper end coupled to a middle portion of the outer upper control arm and a lower end coupled to the lower control arm; and a strut assembly for absorbing vibration and impact transmitted in an up and down direction, which is formed with a shock absorber and a spring, a lower end of the strut assembly being positioned on an upper surface of the outer upper control arm and an upper end of the strut assembly being supported on a supporting portion of the subframe.

In another aspect, the present invention provides the vehicle suspension system, wherein the upper end of the connecting link is closer to the wheel than the lower end of the connecting link.

In still another aspect, the present invention provides the vehicle suspension system wherein a point where an extension line connecting a connecting point of the outer upper control arm and the wheel carrier with a connecting point of the lower control arm and the wheel carrier intersects an extension line of the connecting link becomes an instantaneous center of the outer upper control arm with respect to the wheel carrier and the connecting link.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of the disclosure, illustrate one embodiment of the invention and together with the description, serve to explain the principles of the invention.

DETAILED DESCRIPTION OF A PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 1:
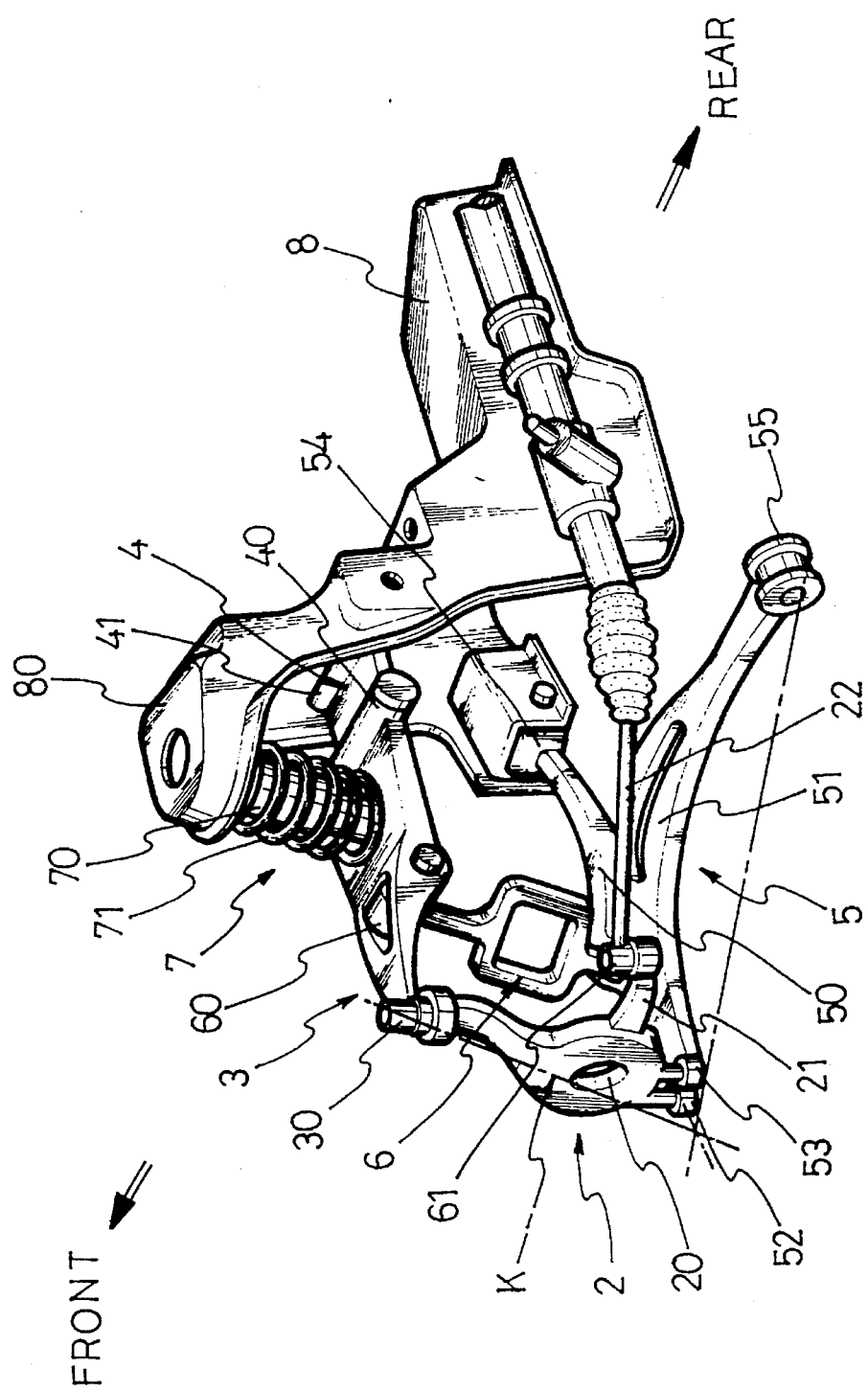
FIG. 1 is a perspective view of a vehicle suspension for a steerable drive wheel in accordance with a preferred embodiment of the present invention.
Figure 2:
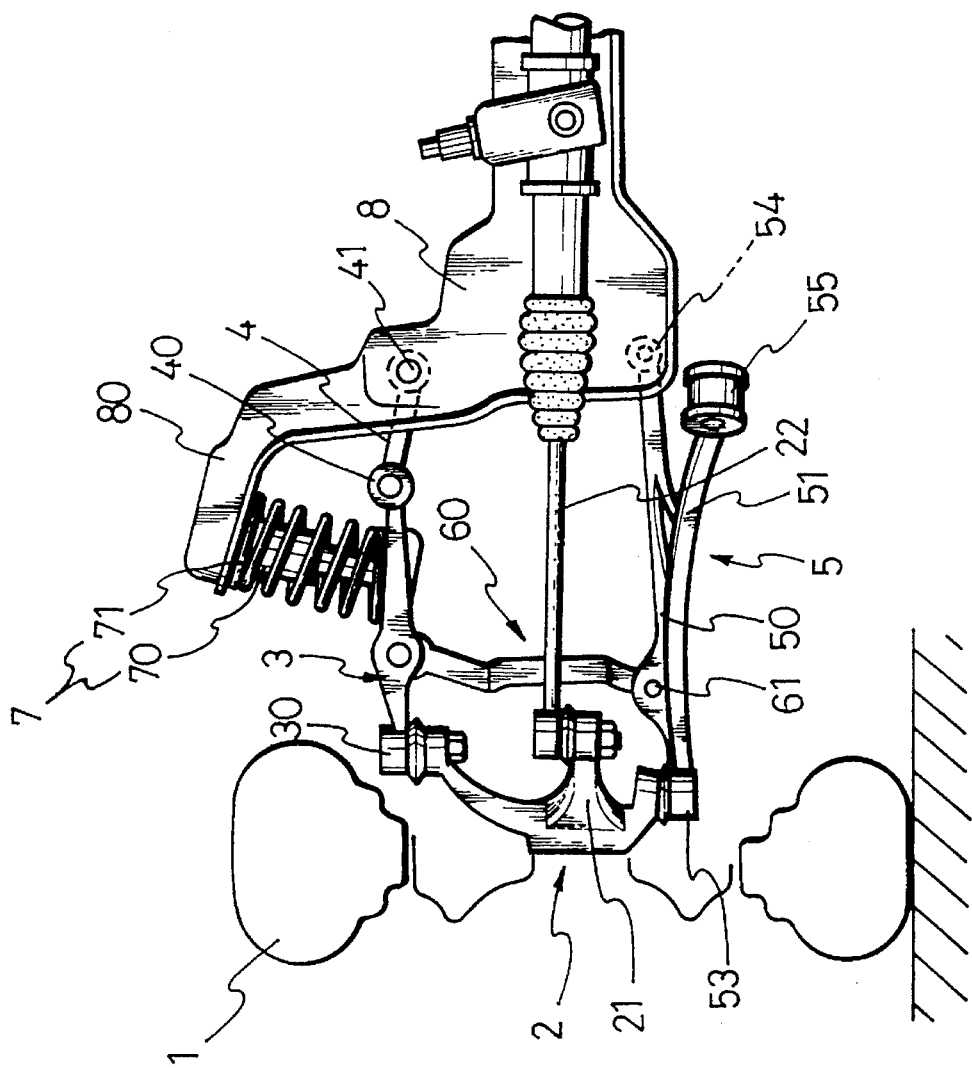
FIG. 2 is a rear view of FIG. 1.
Figure 3:
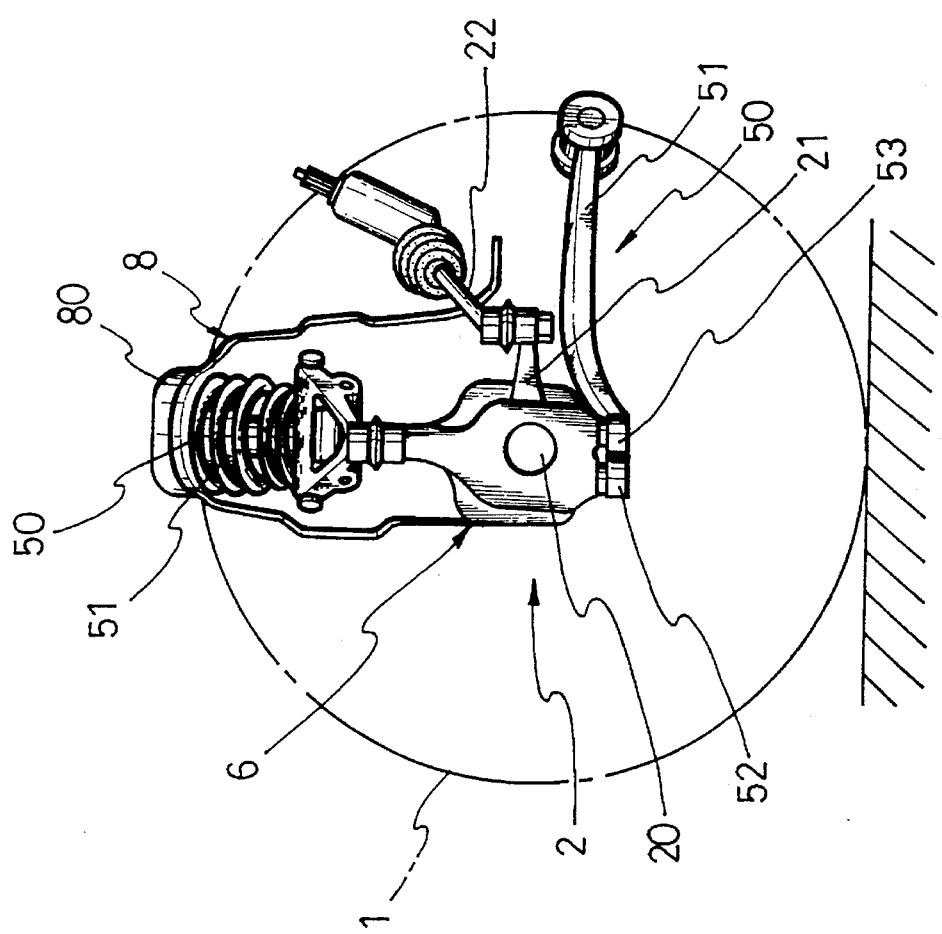
FIG. 3 is a side view of FIG. 2.

Referring to FIGS. 1 to 3, a wheel carrier 2 rotatably supports a wheel 1 (see FIG. 2) in the same manner as conventional art. The wheel carrier 2 is provided with a hole 20 through which a drive shaft penetrates.

A steering arm 21 extends rearward from the wheel carrier 2 and a tie rod 22 is connected by a ball joint 61 with the steering arm 21 for steering the wheel 1.

Further, an outer upper control arm 3 is coupled at its one end to the wheel carrier 2 by a ball joint 30 and at its other end to an end of an inner upper control arm 4 by an elastic bushing 40.

The other end of the inner upper control arm 4 is pivotally coupled to a subframe 8 by inserting an elastic bushing 41.

A lower control arm 5 connecting the lower end of the wheel carrier 2 to subframe and the vehicle body is formed with front and rear control arms 50 and 51. Wheel side ends of the respective front and rear control arms 50 and 51 are coupled to the wheel carrier 2 by ball joints 52 and 53, respectively. A vehicle body side end of the front control arm 50 is pivotally coupled to the subframe 8 by means of an elastic bushing 54. A vehicle body side end of the rear control arm 51 is pivotally coupled to the vehicle body by an elastic bushing 55.

A connecting link 6 connects the outer upper control arm 3 with the lower control arm 5. One end of the connecting link 3 is coupled to a middle portion of the outer upper control arm 3 by means of an elastic bushing 60 and the other end of the connecting link 6 is coupled to the front lower control arm 50 by means of an elastic bushing 61.

A strut assembly 7 for absorbing the vibration and impact transmitted in an up and down direction is formed with a shock absorber 70 and a spring 71. The lower end of the strut assembly 7 is positioned on the upper surface of the outer upper control arm 3 and the upper end of the strut assembly is supported on a supporting portion 80 of the subframe 8.

Accordingly, the displacement amount of the strut assembly is to be less than that in an up and down direction of the wheel 1.

The operation effects of the suspension in accordance with the present invention are described with reference to FIG. 4.

Figure 4:
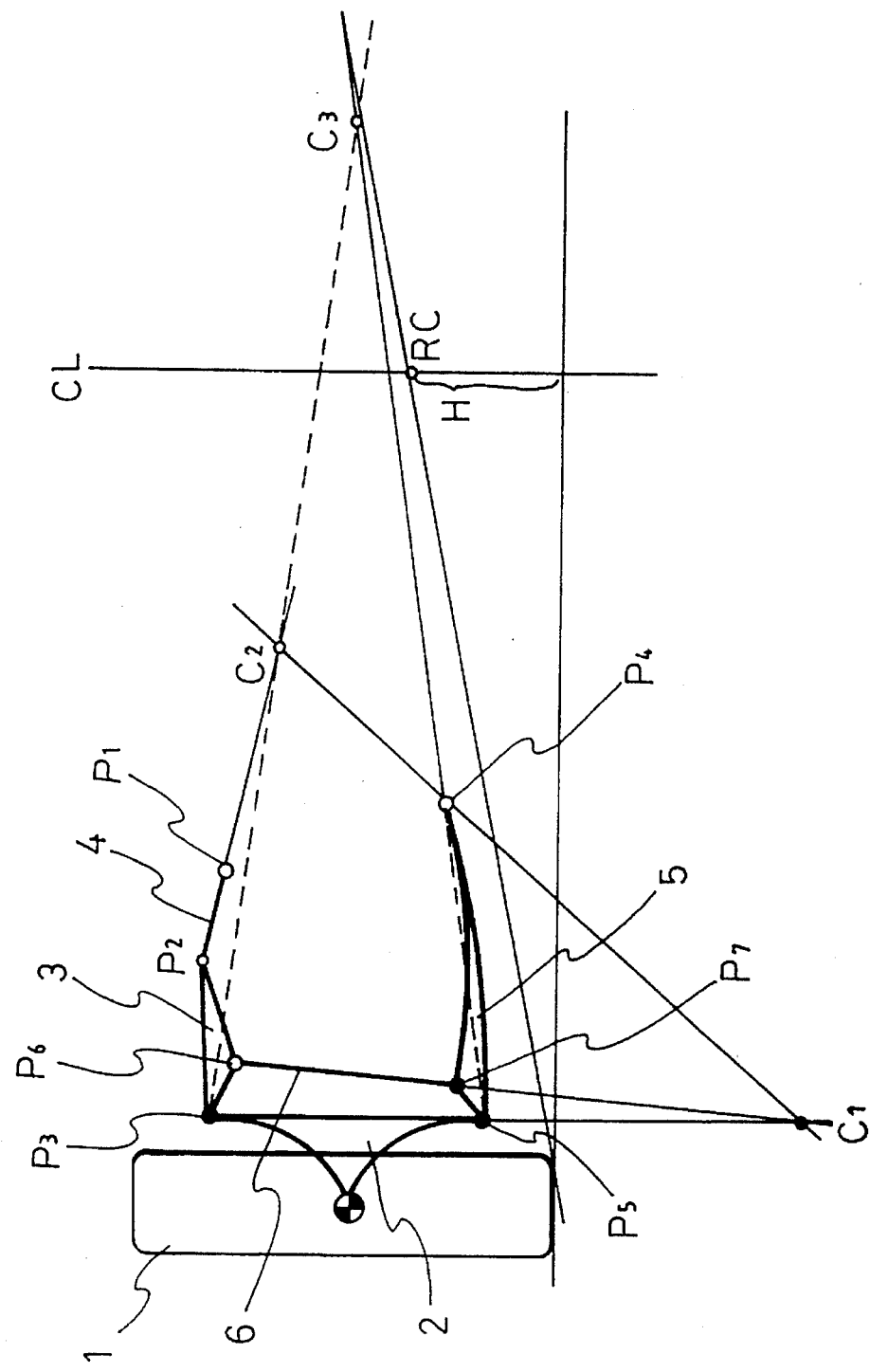
FIG. 4 is a view for illustrating of an operating effect of the vehicle suspension system in accordance with the preferred embodiment of the present invention.
Figure 5B:
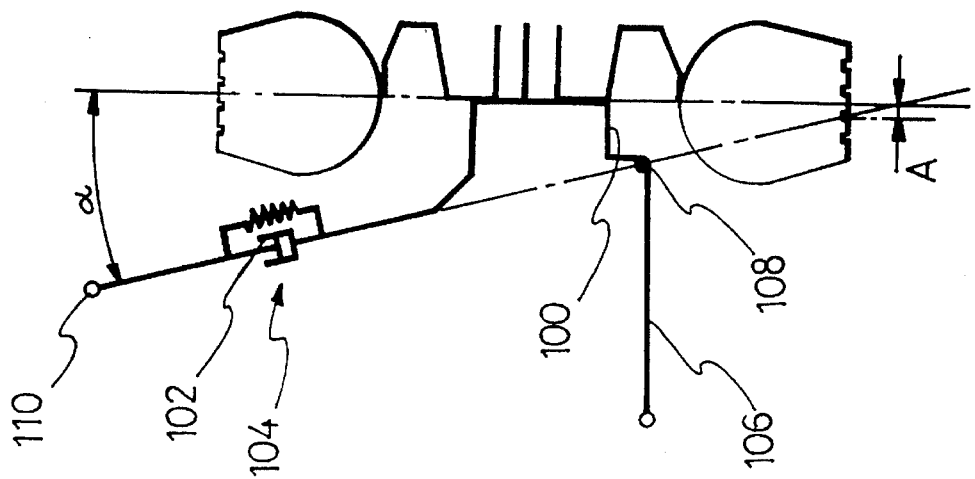
FIGS. 5A and 5B are schematic views of a conventional MacPherson type suspension system.
Figure 5A:
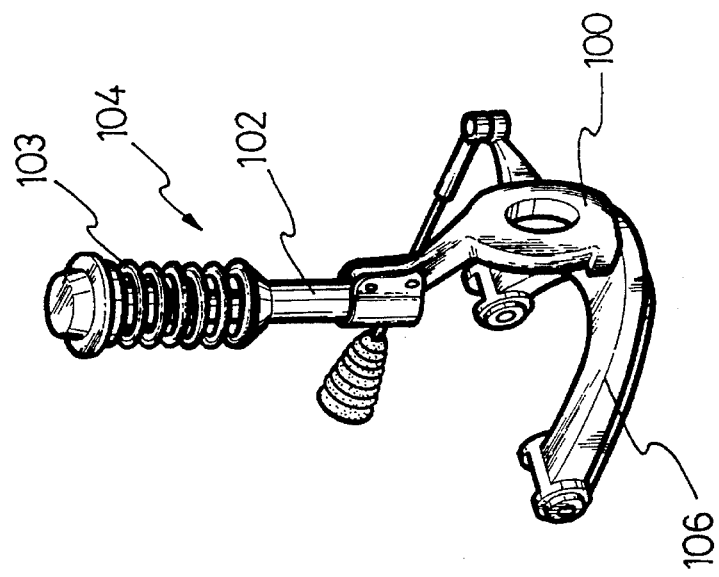
Figure 6B:
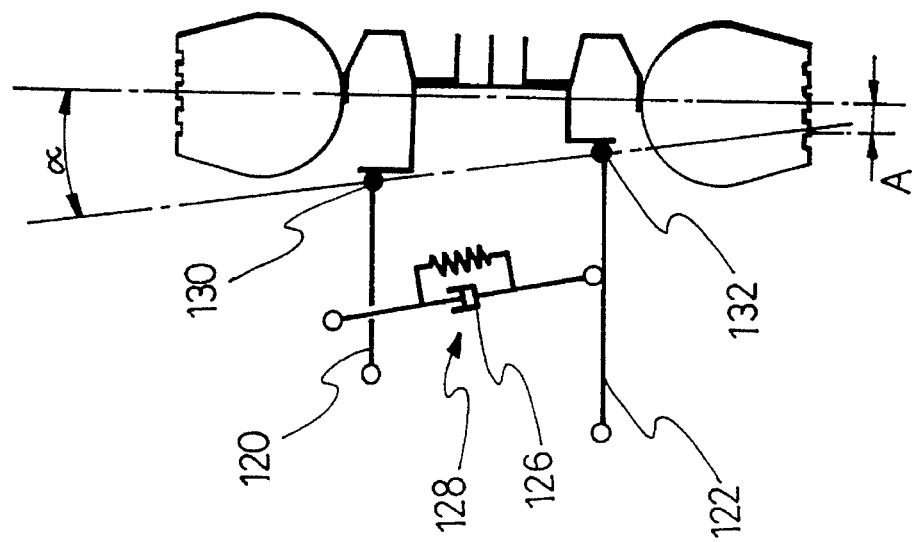
FIGS. 6A and 6B are schematic views of a conventional Wishbone type suspension system.
Figure 6A:
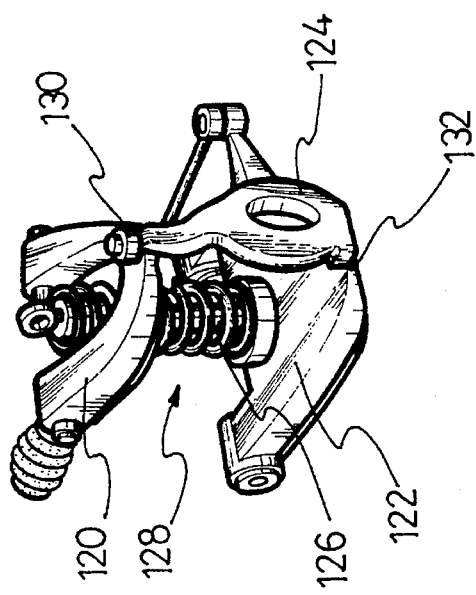

In FIG. 4, each connecting point of arms is designated by reference characters P1, P2, P3 . . . P7 for the convenience of the description.

That is, when the wheel bumps and rebounds or rolling occurs in the vehicle body, the point P1 connecting the inner upper control 4 arm with the vehicle body becomes an instantaneous center of the inner upper control arm 4 with respect to the vehicle body, and the point P4 connecting the lower control arm 5 with the vehicle body becomes an instantaneous center of the lower control arm 5 with respect to the vehicle body. The point P2 connecting the inner upper control arm 4 with the outer upper control arm 3 becomes an instantaneous center of the outer upper control arm 3 with respect to the inner upper control arm 4. Points P3 and P5 become instantaneous centers of the wheel 1 with respect to the inner upper control arm 4 and the lower control arm 5, respectively.

A point C1 where an extension line connecting the points P3 and P5 with each other intersects an extension line connecting the points P6 and P7 with each other becomes an instantaneous center of the outer upper control arm 3 with respect to the wheel carrier 2 and the connecting link 6. A point C2 where an extension line connecting the points C1 and P4 with each other intersects an extension line connecting the points P2 arid P1 with each other becomes an instantaneous center of the connecting link 6 with respect to the vehicle body.

Accordingly, an instantaneous center of the wheel 1 with respect to the vehicle body is formed at a point C3 where an extension line connecting the points P3 and C2 with each other intersects an extension line connecting the points P5 and P4 with each other.

As a result, the line connecting the points P3 and C3 with each other becomes an imaginary swing arm S, that is, imaginary upper control arm.

Accordingly, as shown in FIG. 4, since the length of the imaginary upper control arm P3, C3 is greatly lengthened, the pivot angle of the imaginary upper control arm P3, C3 with respect to the up-and-down variation of the instantaneous center becomes very tiny.

Therefore, the variation ratio of the height of the instantaneous center C3 is relatively minimized. This means that the variation ratio of the height H of a roll center RC that is formed on a point where an extension line connecting the instantaneous center C3 with the ground contacting point of the wheel 1 intersects a center line CL of the vehicle body becomes very tiny. Small variation of the height of the roll center RC improves the driving safety.

Additionally, as illustrated in FIG. 1, an imaginary line connecting a ball joint 30 with a point where an extension line of the front lower control arm 50 intersects an extension line of the rear lower control arm 51 becomes an imaginary kingpin K. Accordingly, it is possible to make the kingpin offset 0 or negative, thereby improving the driving safety.

As described above, since the characteristics of the roll center, camber and wheel tread are defined by a plurality of arms or links, it is easy to establish the kingpin, camber and tread variations all of which relate to the steerable wheel alignment.

It will be apparent to those skilled in the art that various modifications and variations can be made in the suspension system of the present invention and in construction of this system without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A vehicle suspension system for a steerable drive wheel, comprising:

a wheel carrier for rotatably supporting a wheel;

an outer upper control arm having a first end pivotally coupled to the wheel carrier and a second end;

an inner upper control arm having a first end pivotally coupled to the second end of the outer upper control arm and a second end coupled to a subframe;

a lower control arm having front and rear control arms to connect a lower end of the wheel carrier to the subframe and a vehicle body, respectively;

a connecting link having an upper end coupled to a middle portion of the outer upper control arm and a lower end coupled to the lower control arm; and a strut assembly for absorbing vibration and impact transmitted in an up and down direction, which is formed with a shock absorber and a spring, a lower end of the strut assembly being positioned on an upper surface of the outer upper control arm and an upper end of the strut assembly being supported on a supporting portion of the subframe.

2. The vehicle suspension system according to, claim 1, wherein the upper end of the connecting link is closer to the wheel than the lower end of the connecting link.

3. The vehicle suspension system according to claim 1, wherein a point where an extension line connecting a connecting point of the outer upper control arm and the wheel carrier with a connecting point of the lower control arm and the wheel carrier intersects an extension line of the connecting link becomes an instantaneous center of the outer upper control arm with respect to the wheel carrier and the connecting link.

4. The vehicle suspension system according to claim 1, wherein a point where an extension line of the inner upper control arm intersects an extension line connecting an instantaneous center of the outer upper control arm with respect to the wheel carrier and the connecting link with a connecting point of the lower control arm and the vehicle body becomes an instantaneous center of the connecting link with respect to the vehicle body.

5. The vehicle suspension system according to claim 1, wherein a point where an extension line connecting a connecting point of an outer upper control arm and a wheel carrier with a connecting point of an instantaneous center of the outer upper control arm with respect to the wheel carrier and the connecting link intersects an extension line of the lower control arm becomes an instantaneous center of the wheel with respect to the vehicle body.

6. The vehicle suspension system according to claim 1, wherein a roll center is formed on a point where an extension line connecting a ground contacting portion of the wheel with an instantaneous center of the wheel with respect to the vehicle body intersects a center line of the vehicle body.

7. The vehicle suspension system according to claim 1, wherein an imaginary line connecting a connecting point of the outer upper control arm and the wheel carrier with a point where an extension line of the front control arm intersects an extension line of the rear control arm becomes an imaginary kingpin.

* * * * *